United States Patent [19]

Dogey

[11] Patent Number: 5,173,804
[45] Date of Patent: Dec. 22, 1992

[54] MIRROR AND METHOD OF MOUNTING THE SAME

[76] Inventor: Kent Dogey, 1707 Weston Rd., Scotts Valley, Calif. 95067

[21] Appl. No.: 736,618

[22] Filed: Jul. 26, 1991

[51] Int. Cl.$^5$ .............................................. G02B 5/08
[52] U.S. Cl. .................................... 359/507; 359/883
[58] Field of Search ................................ 359/507–509, 359/847, 871, 883, 884

[56] References Cited

U.S. PATENT DOCUMENTS

| | | |
|---|---|---|
| 3,594,063 | 7/1971 | Smillie, III . |
| 3,708,218 | 1/1973 | Smillie, III . |
| 3,936,159 | 2/1976 | Pavernick ........................... 359/847 |
| 4,072,397 | 2/1978 | Ross . |
| 4,232,075 | 11/1980 | Gantz et al. ......................... 359/883 |
| 4,523,849 | 6/1985 | Stone .................................. 359/501 |
| 4,552,438 | 12/1985 | Murphy ............................... 359/847 |
| 4,557,003 | 12/1985 | Jones . |

Primary Examiner—Bruce Y. Arnold
Assistant Examiner—J. P. Ryan
Attorney, Agent, or Firm—Flehr, Hohbach, Test, Albritton & Herbert

[57] ABSTRACT

A mirror for use in a shower or other location which is formed of a thin sheet of impact-resistant material having a reflective front surface and a smooth back surface. The sheet of material is light in weight relative to its area. It is temporarily adhered to a smooth, substantially vertical, flat support surface, such as a shower wall, in a stable position by a liquid film applied to either the mirror or the wall. A method of mounting a mirror in the form of a thin, lightweight sheet having a reflective front surface to a smooth, flat wall including the steps of wetting either the mirror or wall, and adhering the mirror to the wall by pressing the mirror against the wall to form a liquid film behind the mirror is described.

5 Claims, 2 Drawing Sheets

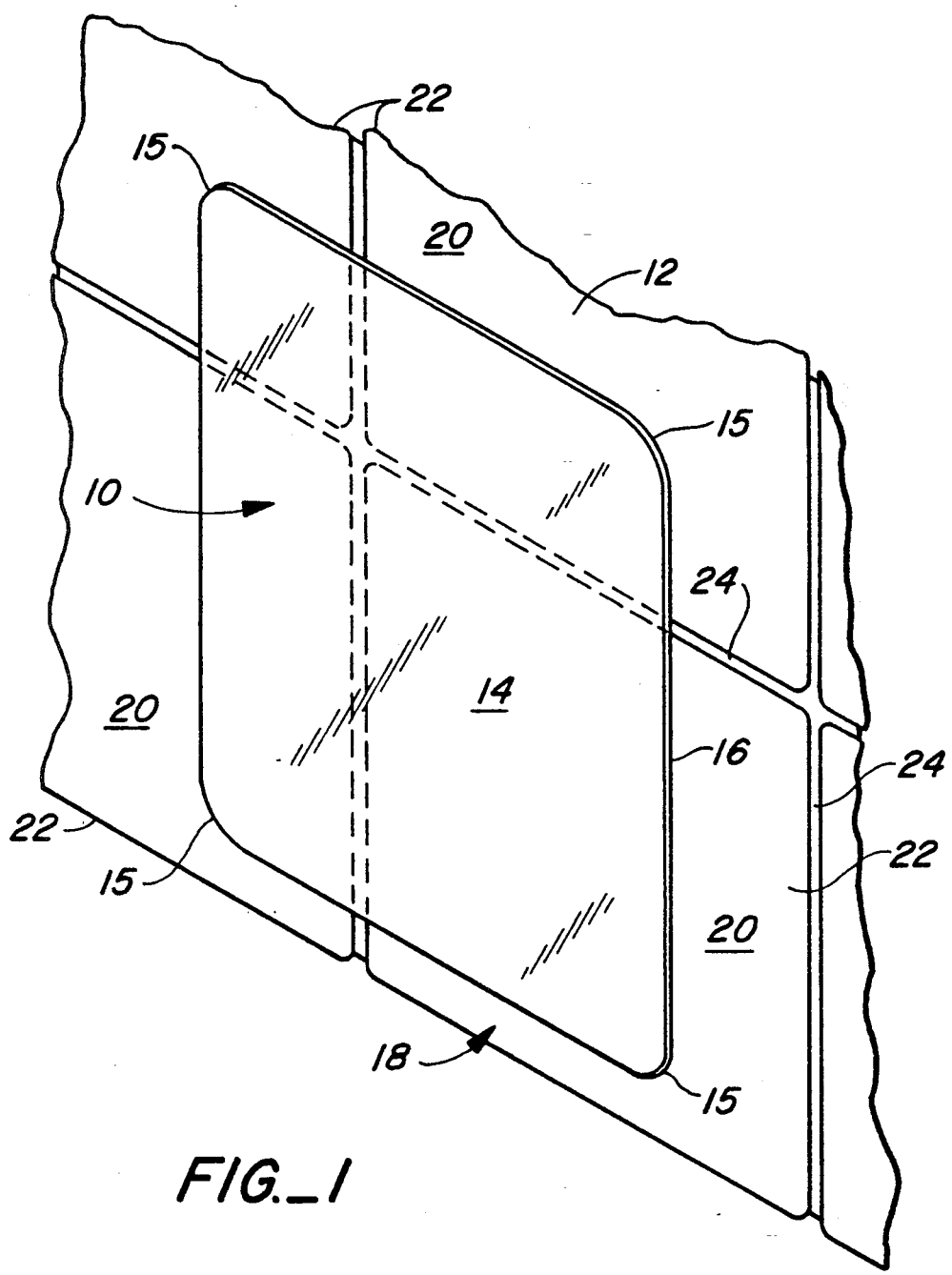
FIG._1

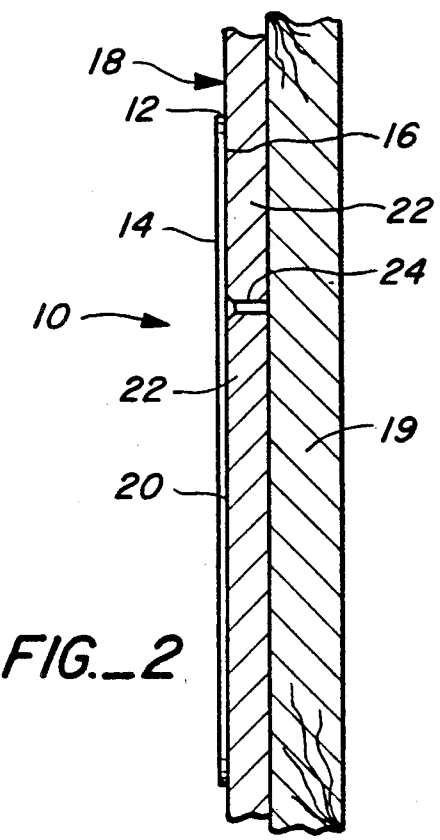
FIG._2
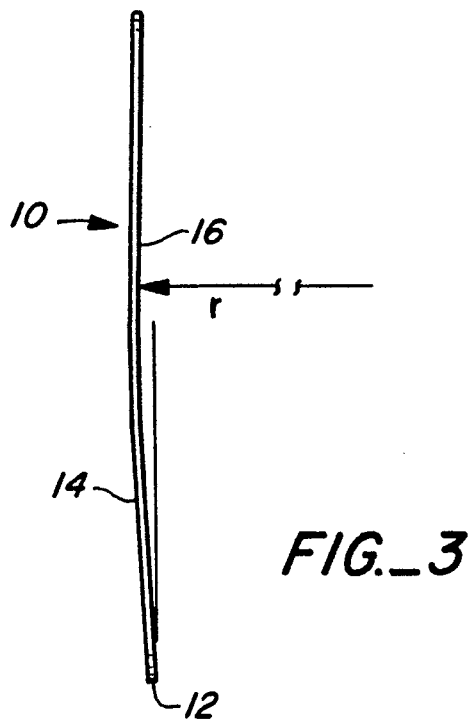
FIG._3
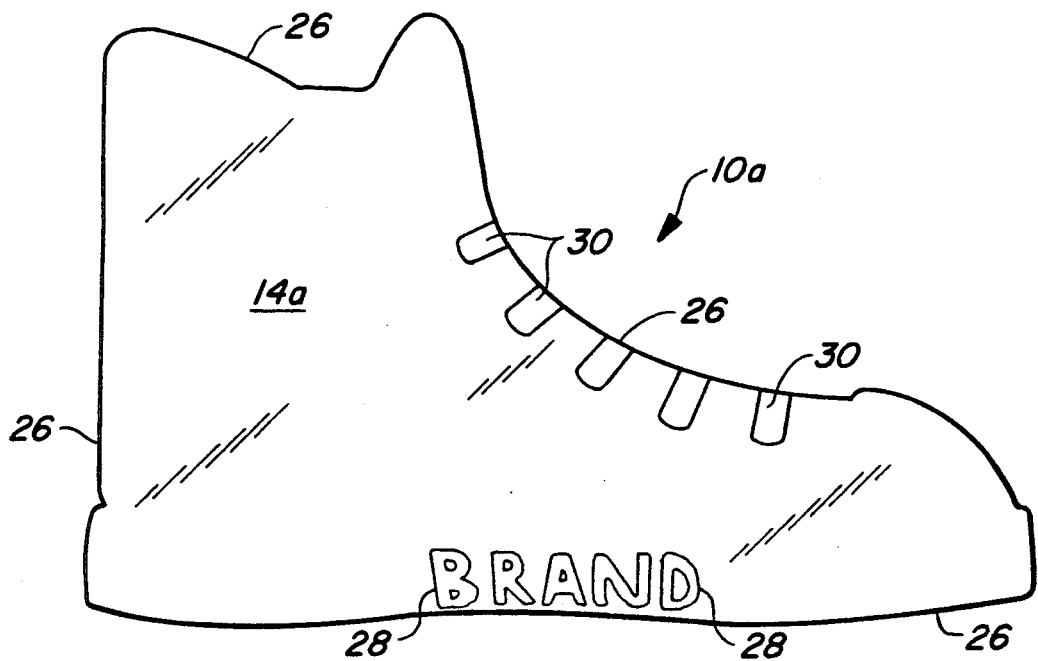
FIG._4

MIRROR AND METHOD OF MOUNTING THE SAME

TECHNICAL FIELD

The present invention relates, in general, to relatively small, portable mirrors, such as may be used in a shower, locker room or office, and more particularly, the invention relates to mirrors which are easily mounted to vertically oriented support surfaces, such as a shower wall, and to a method for mounting of the mirrors to the vertical support surface.

BACKGROUND ART

Various portable or small mirror assemblies have been devised which are well suited for mounting and use in a variety of locations. One example of such mirrors is the shower mirror, which is most often used by men who shave in the shower. Small mirrors, however, have been used in a variety of other applications by both men and women, including mirrors mounted on locker walls, or in offices on file cabinets or wall partitions, and mirrors used in a variety of locations in the home.

Shower-mounted mirrors have several advantages, but prior shower mirrors constructions also have been found to have several disadvantages. One problem that is repeatedly encountered is the tendency of shower mirrors to condense water vapor on them or to fog when the shower is running. Another problem exists in connection with the difficulty of mounting shower mirrors in a shower, which typically is an all-tile environment or a continuous metal or plastic shell. Still further, repositioning of a shower mirror can be difficult, and mirror breakage can pose a safety hazard.

Several rather complex approaches have been devised to attempt to keep shower mirrors from becoming fogged. For example, U.S. Pat. No. 4,557,003 discloses a shower mirror construction in which the mirror is mounted in a housing that forms a plenum behind the mirror. The shower water flows through the plenum to heat the back of the mirror and thereby the front surface, which prevents fogging. The water is discharged from the shower head after passing through the plenum. Other examples of prior art shower mirrors which attempt to solve the fogging problem are disclosed in U.S. Pat. Nos. 4,072,397; 3,594,063 and 3,708,218.

The shower mirrors referenced above are all mounted by relatively complex mechanical mounting structures that relatively permanently affix the mirror in the shower. Moreover, while adjustable mounting structures can be provided, the amount of adjustment of the position of the mirrors inherently is relatively limited. In most instances, the user must adjust his or her position relative to the mirror and the light sources available in the shower.

As also will be seen from the shower mirrors disclosed in the above set forth patents, the mechanical mounting apparatus can be somewhat difficult to install. Moreover, such mounting apparatus can require penetrating the tile with fasteners, which, if they must be repositioned, leave unsightly bore holes that can be the source of moisture damage. Mirror mounting assemblies also add significantly to the overall cost of the shower mirror. But, mechanical shower mirror mounts do tend to have the advantage of securing the mirror in a sufficiently positive fashion that mirror breakage will not occur.

More generally, mounting of mirrors to file cabinets, lockers or room partitions can have many of the same problems found in connection with shower mirrors. Thus, the mounting structure can damage the wall to which the mirror is to be mounted and moving the mirror can be tedious and time consuming.

Portable shower mirrors have also been devised. Such mirrors have been formed from a plastic sheet that has a vapor-deposited reflective surface on one or both sides or from a reflective metallic sheet. These mirrors are hand-held or propped on a ledge or horizontal support surface in the shower. Such portable mirrors have the advantage of infinite adjustability and safety, but they usually require the user to employ one hand to hold the mirror or to have a shower structure which coincidentally has a ledge or horizontal support surface at the correct height and location.

Accordingly, it is an object of the present invention to provide a mirror which can be easily and rapidly mounted to virtually any wet, smooth, flat surface, can be easily adjusted from position-to-position, and when used in a shower, can be easily de-fogged.

Another object of the present invention is to provide a movable mirror which can be temporarily mounted on a wet, smooth flat wall, such as a metallic locker or file cabinet wall or a glass door, window or video screen, without any mechanical support means.

Still a further object of the present invention is to provide a movable mirror which is portable and can be mounted to a wet wall in a manner freeing both hands of the user.

Still a further object of the present invention is to provide a movable mirror which does not pose a safety hazard, which is economical to produce, and which can be easily removed from the wall on which it is mounted and used in other areas.

The movable mirror and method of the present invention have other objects and features of advantage which will become apparent from, or are set forth in more detail in, the accompanying drawings in the following Best Mode Of Carrying Out The Invention.

DISCLOSURE OF THE INVENTION

The movable mirror of the present invention comprises, briefly, a thin sheet of relatively impact-resistant material having a reflective front surface and a smooth back surface, which may or may not be reflective. The sheet, preferably a plastic or metal sheet, has a combination of thickness, density and area selected to enable the sheet to be adhered to a smooth, flat, substantially vertical, support surface in a stable position by a liquid film between the back of the sheet and the support surface when the mirror is pressed against the support surface.

The method for temporary mounting of a movable mirror to a vertical wall of the present invention comprises, briefly, the steps of wetting at least one of a smooth back surface of the mirror and the wall with a liquid, and adhering the sheet to the wall by pressing the sheet against the wall to form a liquid film between the sheet and wall.

BRIEF DESCRIPTION OF THE DRAWING

FIG. 1 is a top perspective view of a mirror constructed in accordance with the present invention.

FIG. 2 is a side elevation view, in cross-section, of the mirror of FIG. 1, shown mounted to a shower wall.

FIG. 3 is a side elevation of the mirror of FIG. 1 prior to mounting to a wall.

FIG. 4 is a front elevation view of an alternative embodiment of the mirror of FIG. 1.

BEST MODE OF CARRYING OUT THE INVENTION

The movable mirror of the present invention, generally designated 10, can be seen from FIGS. 1, 2 and 3 to be comprised of a thin sheet of material 12 having a reflective front surface 14 and a smooth back surface 16, which also can advantageously be a reflective surface. Sheet 12 should be formed of a material which is impact-resistant or non-breakable if it is dropped in a shower or onto a hard floor. Thus, as used herein, the expression "impact-resistant" shall mean that the sheet will not fracture when dropped on a hard surface. It is contemplated, as will be set forth in more detail below, that mirror 10 will be temporarily mounted to a vertical wall, such as a shower wall, file cabinet, locker wall or office partition, and it is quite possible that mirror 10 will drop or fall away from the wall and impact on the floor, making it important that sheet 12 be an impact-resistant or a non-breakable material.

Sheet 12 must be sufficiently thin and have a density which is sufficiently low and an area which is sufficiently high that the sheet can be adhered to smooth, a flat vertical wall by a liquid film positioned between back surface 16 and a wall, such as a shower wall 18. It has been found that sheet material having a thickness less than about 0.020 inches, a density less than about 180 pounds per cubic feet, and an area greater than about 4 square inches will adhere to a vertical wall 18 in a stable position when a liquid film is used. The most preferred liquid is water, but other liquids, such as water with soap or saliva, can be used. The mirror weight must be balanced and supported by the adhering forces of the liquid film, which are believed to be primarily surface tension forces.

As used herein, the expression "stable position" shall mean in substantially the same position or location for a time period at least long enough to perform a task using the mirror without manually supporting the sheet, such as shaving or combing the user's hair, and preferably at least ten minutes.

In the preferred form, sheet 12 is provided as a plastic sheet having a metalized front surface 14, for example, an aluminum or aluminum alloy vapor-deposited on surface 14. Many plastics are suitable for use with the present invention since they typically have densities in the range of about 60 to about 130 pounds per cubic foot. One of the most advantageous plastic sheet materials is polyethylene terephthalates (PET) which is sold under the trademark MYLAR. It will be understood that polyester, polycarbonates, and vinyls also can be used.

In the preferred form sheet 12 has a thickness in the range of about 0.020 to about 0.001 inches, with a PET sheet having thickness of 0.010 inches being very suitable for use in the present invention. The sheet and material should be thick enough to enable the user to wet the back, adhere the sheet to wall 18 and displace the sheet along wall 18 to a desired position while adhered to the wall, without wrinkling the sheet. As the sheet thickness falls below 0.001 inches, sliding the sheet along the wall can result in wrinkling. Moreover, as the thickness of the sheet diminishes, the sheet tends to conform more to irregularities in the wall and/or debris on the wall, with resulting distortion of the reflecting front surface. A sheet thickness of 0.005 to 0.010 has sufficient thickness to enable wrinkle-free movement along the wall and front surface 14 will remain sufficiently flat to maintain good imaging.

The area of sheet 12 should be greater than 4 square inches and most preferably greater than 10 square inches. Moreover, the sheet advantageously has a substantial transverse dimension for viewing and to facilitate adherence.

In the most preferred form a generally rectangular sheet having rounded corners 15 is employed, and a sheet 3.25 inches by about 4 inches can be conveniently mailed in most envelopes. It will be understood, however, that many other shapes and sizes of sheets are suitable for use to provide the mirror of the present invention, as will be set forth in more detail in connection with FIGS. 4.

In order to reduce the negative effects of scratching of reflective front surface 14, back surface 16 may also be metalized. Thus, a vapor-deposited aluminum material on back surface 16 will prevent the thin mirror sheet from becoming transparent in the area of a scratch. Scratches must coincidentally be aligned or superimposed on the front and back surfaces when both surfaces are metalized. On plastics which are clear or translucent coating or depositing a reflective surface on both the front and back makes scratches less debilitating. Moreover, if a sheet becomes scratched on one side, and both sides are reflective, the sheet can simply be turned over and adhered to wall 18 by the former front surface 14, with the former back surface 16 being used as the viewing surface.

It is also possible to use thin polished or reflective metallic sheets to provide the mirror of the present invention. Polished aluminum, typically having a density of 165 pounds per cubic foot and a thickness of 0.010 inches, is suitable for liquid film adherence to wall 18. It may be possible to use even more dense materials, such as stainless steel, if the wall thickness is thin enough. Metals tend to have cost disadvantages and to be less capable of adhesion to vertical walls in a stable position by water.

In the movable mirror and method of the present invention, mirror 10 is temporarily adhered to a smooth, flat, substantially vertical, support surface, such as shower wall 18, or a locker wall or file cabinet, by a liquid film, advantageously water. The liquid is placed either on smooth back surface 16 or on the front surfaces 20 of wall 18, in FIG. 1 on front surface 20 of tiles 22. As is common in tiled showers, the tiles are mounted on support member 19 and joined by grout recesses 24. Grout recesses 24 break the continuous tile surface, but as used herein, tiles 22 present substantial areas of smooth, flat surfaces 20, which surfaces will insure adhesion of the mirror to wall 18 by means of the water film. Grout recesses or other surface discontinuity, however, will tend to reduce the time that the mirror will adhere to wall 18 without rewetting.

The use of liquid adhesion to effect mounting of mirror 10 to wall 18 has numerous advantages. First, the liquid film effect can be used to mount a mirror to wall 18 in a stable, stationary position for a time which is sufficiently long to enable performance of a task, such as shaving. It is not necessary that mirror 10 be permanently mounted in the wall by the surface tension forces, and in fact it is not even desirable. Using sheets of 3.25 inch by 4.0 inch PET having vapor-deposited aluminum on both sides and a thickness of 0.010 inches, sheet 10 can be adhered to glass or tile for days, and even weeks or months, depending on smoothness and humidity.

One of the features of the method and lightweight mirror of the present invention is that condensation on the mirror front surface can be reduced significantly by merely rubbing soap, saliva or toothpaste on front surface 14. Defogging the shower mirror of the present invention, therefore, can be easily accomplished, as needed, and low or non-fogging films also can be applied to the mirror.

Moreover, the position on wall 18 can be easily adjusted by sliding the sheet along the liquid film between the mirror and wall and repositioning the mirror to a location which is most convenient for the user, given the wall configuration and the various light sources in the area.

It has been found that shower mirrors constructed in accordance with the present invention can be adhered to a tile wall, fiberglass or glass door for considerably longer than one day. As water evaporates from behind the mirror, the adhesion forces decrease, and at some point the weight of sheet 12 will be too great to hold the mirror in a stable position on the wall. The mirror will begin to slide down the wall or will break free and fall from the wall. Since the sheet is an impact-resistant or substantially non-breakable sheet, however, such falling of the mirror from the wall is not critical. As a practical matter, the user simply can pull the mirror off the wall periodically, re-wet the rear surface and remount the mirror on the wall before it falls. On days in which evaporation is greater, the user simply picks the mirror up off the floor of the shower and rewets the back surface so that it can be pressed against a smooth surface to adhere it to a wall.

One of the additional important advantages of using water surface tension to temporarily adhere mirror 10 to smooth wall 18 is that the need for penetrating the wall with mechanical fasteners, has been eliminated. Thus, the problem of moisture leaking through screws or other fasteners into the wall is not present with the mirror assembly of the present invention. The ability to easily reposition the mirror of the present invention allows the user to optimize the positioning without having multiple sites at which mechanical fasteners have been used to permanently fasten a mirror mount to wall 18. Thus, mirror 10 can even be mounted to the glass front screen of a video display terminal, or the side of a locker or file cabinet, without damage to the mounting surface.

In order to provide enhanced usefulness, mirror 10 is further advantageously formed from a sheet stock having a slight curvature and a resilient memory. Thus, PET sheet having a thickness of 0.010 inches, typically is available in roll stock which results in the sheet having a slight radius of curvature, as is shown at r in FIG. 3. The back side 16 of sheet 12 will be concaved slightly, which produces a slight, but noticeable, image magnifying effect. The material memory is not sufficient, however, to impede flattening of the mirror and adhesion against wall 18 by the liquid film. Nevertheless when not adhered, and when back surface 16 is reflective, mirror 10 can be used as a magnifying mirror. Typically, about 0.020 to about 0.040 depth at the center of surface 16 will be present when the mirror is free-standing. The user can easily increase this concavity and magnification by slightly flexing the mirror between the upper and lower edges.

If more than a temporary mount is desired, a small amount of adhesive material can be employed instead of or in addition to water or a non-adhesive liquid. Thus, while a paste will not secure heavy objects to certain surfaces, for example, glass, the addition of a paste, or water soluble adhesive, to water will effect mounting of the mirror of the present invention to most smooth flat surfaces for months. Similarly, liquid adhesives which are not water-based can be used. In either case, the mirror can be pressed against a surface and then repositioned on the underlying liquid film to the desired location.

While one of the most difficult and common cases is adherence of mirror 10 to a vertical wall or support surface, the mirror of the present invention can be secured by liquid film adhesion to non-vertical surfaces. Adherence to downwardly facing horizontal surfaces for more than a day is clearly possible using plastic sheets having a thickness of 0.010 inches.

In FIG. 4 an alternative embodiment of the mirror of the present invention is illustrated. Thus, mirror 10a is formed from a thin sheet with a reflective front surface 14a. The peripheral edge 26 of mirror 10a has been die cut or otherwise formed to have a decorative, ornamental or customized shape, in this case a tennis shoe. The thin nature of the sheet allows indicia 28, such as a brand name, to be hot or cold embossed into the sheet. Usually, indicia 28 would be embossed to protrude outwardly of front surface 14a, although it also can be recessed or protrude inwardly. It is also possible to colorize or paint design elements 30 on front surface 14a to thereby provide a highly useful mirror which is decorative or customized and can carry commercial or other messages.

The method of the present invention includes the steps of wetting one of smooth back surface 16 of lightweight sheet 12 of reflective material and a smooth, flat wall 18 with a liquid. Additionally, the method includes the step of adhering the mirror to the wall by pressing the sheet against the wall to form a liquid film between the sheet and the wall to effect adhesion of the sheet to the wall in a stable position for a time sufficient to enable performance of a task using the mirror. In the preferred form, the method is accomplished by pressing a sheet of metalized plastic to the wall and includes the further step of displacing the sheet along the wall while adhered by the liquid film to a desired location.

The method of the present invention also contemplates the additional steps of removing the temporarily adhered mirror, re-wetting one of the back surface 16 and the wall with a liquid, and re-adhering the mirror to the wall. Finally, the method of the present invention can include the step of applying a defogging agent, such as soap, saliva, toothpaste or commercial defoggers to the front surface of the mirror.

As will be appreciated, the mirror of the present invention can be manufactured at very low cost. It requires only a relatively thin, impact-resistant, lightweight, reflective material, such as metalized plastic which is die cut or otherwise formed of the desired peripheral configuration. Moreover, such a mirror can be hand-held and used in or out of a shower environment.

What is claimed:

1. A mirror for mounting to a smooth flat surface, such as a vertically extending wall, comprising:
    a thin sheet of relatively impact-resistant plastic material having a metallized reflective smooth front surface and a smooth back surface, said sheet having a thickness in the range of 0.005 to 0.020 inches and density less than about 150 pounds per cubic foot to enable adherence of said sheet to said wall in a stable position solely by means of a liquid film positioned between said back surface and said wall; and a layer of anti-fogging agent carried by and covering said front surface.

2. A method for mounting a mirror to a vertically extending wall comprising the steps of:
a) wetting at least one of said wall and a smooth back surface of a sheet of plastic material having a metallized reflective smooth front surface, a thickness between about 0.005 and 0.020 inches and a density less than 180 pounds per cubic foot, with a liquid; and
b) adhering said sheet to said wall solely by surface tension forces by pressing said sheet against said wall until said liquid forms a liquid film between said sheet and said wall substantially covering said back surface to effect temporary mounting of said sheet to said wall in a stable position for sufficiently long to enable performance of a task using said sheet as a mirror.

3. A method for mounting a mirror to a vertically extending wall comprising the steps of:
a) wetting at least one of said wall and a smooth back surface of a lightweight sheet of plastic material having a metallized reflective front surface with a liquid, said sheet having a thickness less than about 0.020 inches and a density less than about 150 pounds per cubic foot;
b) adhering said sheet to said wall by pressing said sheet against said wall until said liquid forms a liquid film between said sheet and said wall to effect temporary mounting of said sheet to said wall in a stable position for sufficiently long to enable performance of a task using said sheet as a mirror; and
c) prior to performing said task, applying an anti-fogging agent to said front surface of said sheet.

4. A mirror for mounting to a smooth flat surface, such as a vertically extending wall, comprising:
a sheet of relatively impact-resistant plastic material having a metallized reflective smooth front surface and a smooth back surface, said sheet having a density less than 150 pounds per cubic foot and a minimum thickness of at least 0.005 inches for substantially wrinkle-free sliding of said sheet along said wall when adhered thereto by a liquid film and a maximum thickness of 0.020 inches to enable adherence of said sheet to said wall in a stable position solely by means of surface tension forces from a liquid film positioned between said back surface and said wall.

5. The mirror as defined in claim 4 wherein,
said sheet is provided with a reflective surface on both said front surface and said back surface.

* * * * *

UNITED STATES PATENT AND TRADEMARK OFFICE
CERTIFICATE OF CORRECTION

PATENT NO. : 5,173,804

DATED : December 22, 1992

INVENTOR(S) : Kent Dogey

It is certified that error appears in the above-identified patent and that said Letters Patent is hereby corrected as shown below:

Column 7, line 29, claim 3, after "sheet of" and before "plastic" insert ---relatively impact-resistant---.

Signed and Sealed this

Twenty-sixth Day of October, 1993

Attest:

BRUCE LEHMAN

Attesting Officer     Commissioner of Patents and Trademarks